Patented Nov. 27, 1951

2,576,597

UNITED STATES PATENT OFFICE 2,576,597

DEHYDRATED CHEESE PRODUCTS AND METHOD OF MAKING

Louis Gootgeld, Escondido, Calif.

No Drawing. Application November 15, 1950,
Serial No. 195,923

5 Claims. (Cl. 99—116)

This invention relates to the production of dehydrated soft cheeses, and its principal object is to produce a dehydrated soft cheese which is capable of rehydration to yield a product with essentially the same taste and baking properties as the original cheese. Another principal object of the invention is the preparation of a dry cheese cake mix which can be packed, shipped, stored and merchandised like the known conventional cake mixes.

Milk protein comes to market in four principal forms—1) as liquid milk or buttermilk, 2) as the soft curd obtained by precipitating the casein (variously known as baker's cheese, cottage cheese, farmer's cheese, etc.) which consists of a curd of casein enclosing a major portion of whey, ranging from 50% to 80% or more of water, and averaging about 70% water, 3) as the largely dehydrated ripened curd containing whey solids and/or butterfat, known as hard cheese, and 4) as casein, free of fat, whey solids and as fairly completely dehydrated.

It is possible to dehydrate liquid milk and buttermilk, by a number of known techniques, to obtain a relatively moisture free powder which can be redissolved as liquid milk. But attempts to dehydrate soft cheeses have uniformly failed to produce a product which would rehydrate to a soft cheese; one obtains either a hard cheese, or a mixture of casein with whey solids, neither of which can be reconstituted into a product resembling the original soft cheese.

I have discovered that the entire class of soft cheeses (baker's cheese, cottage cheese, farmer's cheese, Neufchatel cheese, cultured buttermilk, buttermilk cheese and the like) can be dehydrated to yield storable products which produce acceptable and palatable soft cheeses on rehydration comparable in flavor and texture with the original cheeses if the dehydration is carried on under such conditions that the general space relationship between the casein forming the individual curds, and the occluded whey, is substantially undisturbed during the operation; it is necessary to arrest migration of the whey during the drying operation, keeping it on the inside of the casein curds and away from the outside, so that on rehydration, the whey solids remain trapped in the casein curds, as in the original cheese.

This relationship can be maintained by quick freezing the cheese, in the manner well known to the art, using temperatures of the range −20° to −70° C. or lower; the very fine water crystals containing the whey solids remain embedded in the casein crust forming the curd walls. The moisture is then withdrawn while maintaining the whey in frozen condition, so that the solids cannot migrate; this condition can be obtained by utilizing high vacuum to sublime the moisture content, never allowing the temperature to rise during the operation to a point where the whey liquifies. Obviously, the temperature may be raised above 0° C. when the moisture content becomes low enough so that it will not liquify the whey solids and permit them to migrate through the relatively porous casein films surrounding them; but in general, the rise should be gradual, with the migration in view. The final product is dried to below 2% of water. It consists essentially of casesin films surrounding whey solids.

On rehydration of this product, the whey solids are protected from the added water by the film of casein; as this swells, it feeds water to the whey solids in the interior of the films, to end up with the original product—a curd of hydrated casein having whey embedded therein.

My new product can be used as is, to reproduce soft cheeses. But it can also be blended with other dry food products, to produce dry cheese foods, which can be rehydrated. A cheese cake filling of unusual merit can be prepared by blending my dried soft cheese with powdered dehydrated milk and eggs, flour and seasoning; on rehydration, such a mixture can be used in place of a blend of soft cheese, whole milk, eggs, flour and seasoning, to prepare a cheese cake equal in all respects to one prepared from fresh materials.

I have dried soft cheeses prepared from whole milk, from skim milk and from buttermilk, whether by acid precipitation, rennet precipitation or by culturing (as with the soft cheese known as cultured buttermilk cheese). In every case, it is essential to quick dry the cheese, to get very fine crystals of the whey which do not break the casein films which have the whey entrapped therein; and then to sublime off the water without liquifying the whey and give the solids an opportunity to migrate outside the whey films, to a point where the cheese is relatively safe from putrefaction (ca. 2% water content).

While I have indicated that the reconstituted cheese can be eaten directly as a very palatable substitute for fresh cheese, and that it can be used to produce, for the first time, a dry cheese cake mix, the dry cheese can obviously be used, after reconstitution, for other uses to which soft cheese can be put.

I claim:

1. The method of dehydrating a soft cheese comprising a casein curd enclosing a major portion of whey, to produce a storable product which can be rehydrated to a soft cheese of comparable flavor and texture with the original cheese, which comprises quick freezing the cheese, and reducing the water content of the cheese from its original major content to below 2%, while maintaining the cheese under such conditions that the whey does not migrate from the interior of the curds to the outer surfaces.

2. The method of dehydrating a soft cheese comprising a casein curd enclosing a major portion of whey, to produce a storable product which can be rehydrated to a soft cheese of comparable flavor and texture with the original cheese, which comprises quick freezing the cheese, and reducing the water content of the cheese from its original major content to below 2%, and subjecting the cheese to high vacuum, maintaining the temperature sufficiently low during the operation so that at any point in the operation the whey solids and the residual water are not liquified.

3. The method of dehydrating a soft cheese comprising a casein curd enclosing a major portion of whey, to produce a storable product which can be rehydrated to a soft cheese of comparable flavor and texture with the original cheese, which comprises quick freezing the cheese at temperatures below $-20°$ C., and reducing the water content of the cheese from its original major content to below 2%, and subjecting the cheese to high vacuum, maintaining the temperature sufficiently low during the operation so that at any point in the operation the whey solids and the residual water are not liquified.

4. As a new product, a mixture of milk casein and whey solids containing under 2% moisture, in which the whey solids are surrounded by milk casein films, whereby, on rehydration, a soft cheese is obtained comprising whey occluded in a casein curd.

5. A dehydrated soft cheese reconstituable to its original state, the individual particles of which comprise casein films surrounding whey solids.

LOUIS GOOTGELD.

REFERENCES CITED

The following references are of record in the file of this patent:

UNITED STATES PATENTS

| Number | Name | Date |
| --- | --- | --- |
| 1,738,275 | Baker | Dec. 3, 1929 |
| 1,752,521 | Day | Apr. 1, 1930 |
| 2,446,550 | North et al. | Aug. 10, 1948 |